Jan. 12, 1943. G. W. ASHLOCK, JR 2,308,039
FRUIT PITTING DEVICE
Original Filed May 28, 1941 2 Sheets-Sheet 1
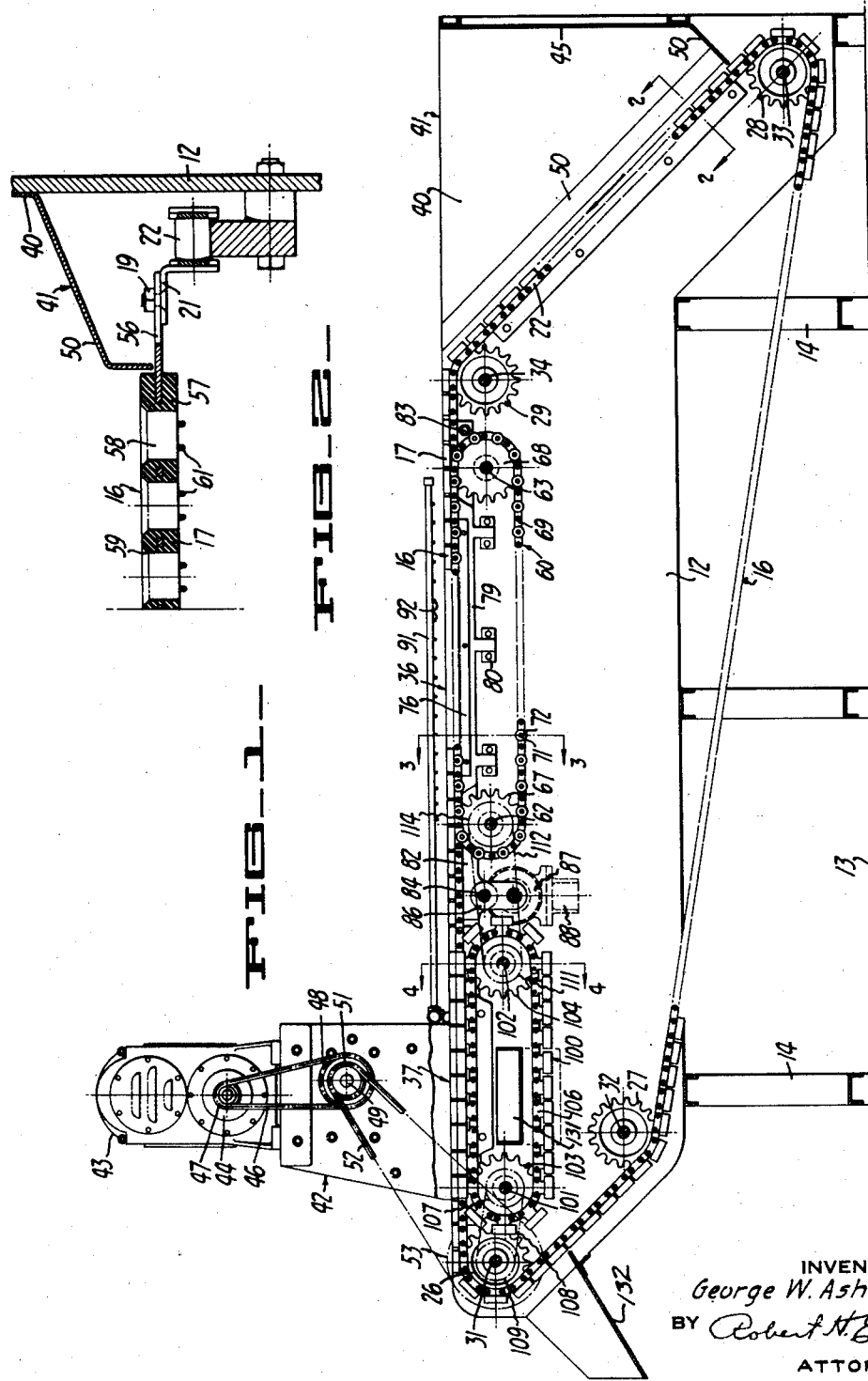
INVENTOR
George W. Ashlock Jr.
BY Robert N. Eckhoff
ATTORNEY

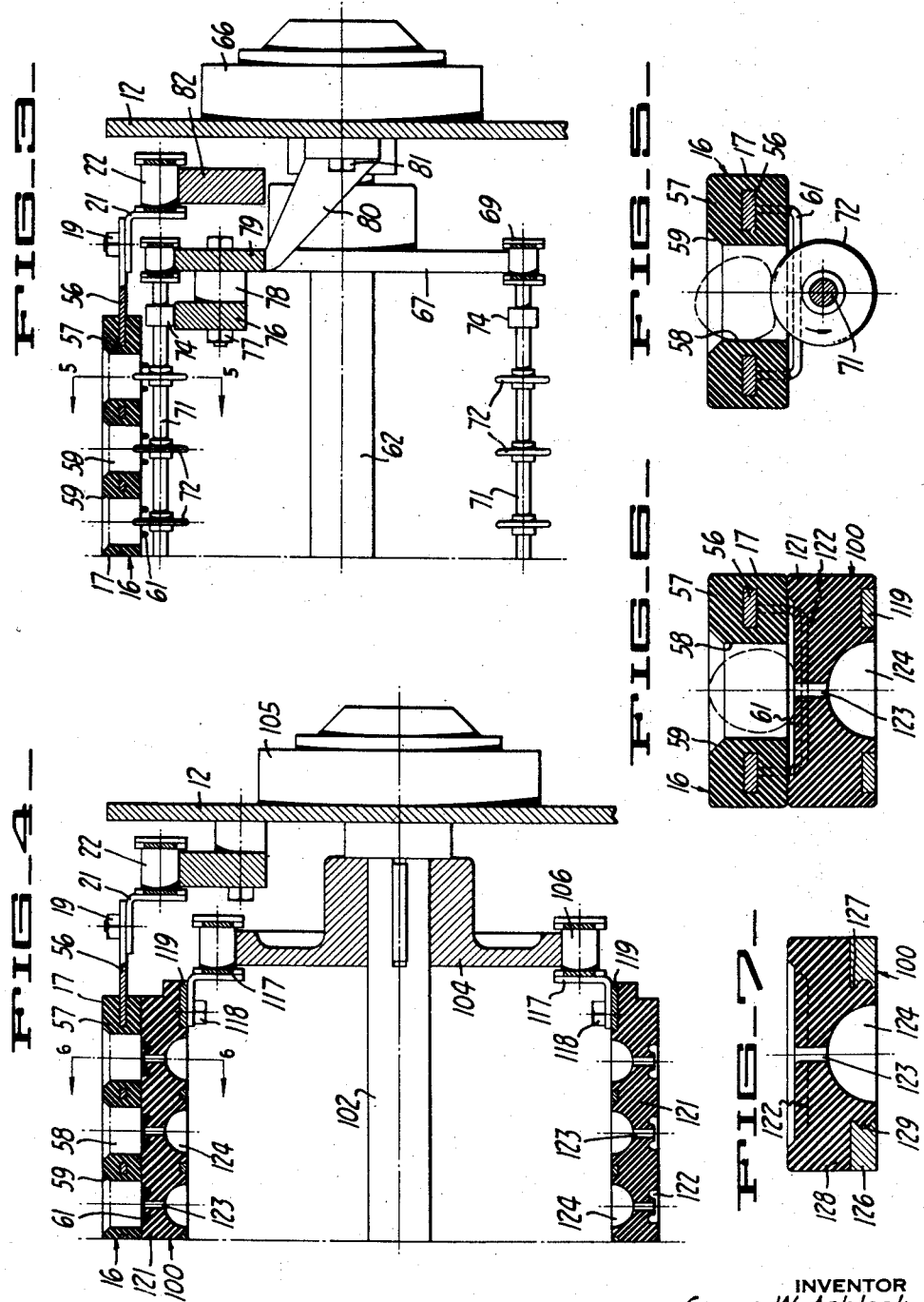

Patented Jan. 12, 1943

2,308,039

UNITED STATES PATENT OFFICE 2,308,039

FRUIT PITTING DEVICE

George W. Ashlock, Jr., Oakland, Calif.

Original application May 28, 1941, Serial No. 395,670. Divided and this application January 9, 1942, Serial No. 426,119½

3 Claims. (Cl. 146—19)

This is a division of application Serial No. 395,670 filed May 28, 1941, wherein I have disclosed a machine useful for the orientation of generally spherical articles having at least one face thereon capable of stably supporting the article on a horizontal surface as well as to subsequent processing of the articles. As such an article, and solely by way of example, I particularly mention cherries; the machine of the present invention is particularly adapted to the orientation of cherries and other fruit having a stem indentation and to the subsequent stoning or other processing.

It is in general the broad object of the present invention to provide means for pitting cherries oriented on the aforementioned machine. While in various of my previous patents I have dealt with machines generally directed to this end, the machine of the present invention is particularly characterized in its simplicity, rapidity of operation, ease of maintenance, and particularly in its efficiency and it is a further object of the invention to provide such a machine.

Another object of the present invention is to provide a machine enabling cherries to be successfully oriented and pitted even though the cherries are irregular in shape and somewhat irregular as to size. Previous cherry orienting and pitting devices have been successful if the cherries were uniform both as to size and shape. One cannot control the shape of a cherry and since the sizing operations usually practiced depend upon the shape of the cherry, various size cherries will come through in the same grade as a result of a grading operation. The machine of the present invention is particularly adapted to produce a high percentage of cherries oriented with respect to the stem indent and pitted therethru irrespective of their shape.

The invention includes other objects and features of advantage, some of which, together with the foregoing, will appear hereinafter wherein the present preferred form of machine of this invention is disclosed.

In the drawings accompanying and forming a part hereof,

Figure 1 is a side elevation partly in section illustrating a machine embodying the present preferred form of a machine embodying this invention.

Figures 2, 3, 4, 5 and 6 are respectively section lines taken along the designated section lines 2—2, 3—3 and 4—4 in Figure 1; 5—5 in Figure 3; 6—6 in Figure 4.

Figure 7 is a section through a modified form of pitting chuck support.

The frame

The machine of the present invention includes a suitable frame structure made up of suitable structural elements including side plates 12 jointed together by suitable cross bracing (not shown) and supported as by legs 14 from a supporting surface such as the floor 13. The side plates 12 are spaced apart a suitable distance, the plates being generally rectangular in shape except as appears in the right hand portion of Figure 1 whereat the plates depend to almost the floor level.

The feed conveyor

A first or feed conveyor structure generally indicated at 16 is provided. This conveyor structure is made up of a series of conveyor members generally indicated at 17 (presently further described in detail) secured by bolts 19 to angle pieces 21 on conveyor chains 22 positioned on opposite sides of the machine. The chains 22 pass about suitable supporting sprockets, there being four sets of these 26, 27, 28 and 29, the sprocket sets being respectively secured on shafts 31, 32, 33 and 34, suitably journaled in the side plates 12 of the machine. Shafts 31 and 34 are normally positioned at about the same level so that the run of the conveyor between them is normally horizontal providing an orientation section generally indicated at 36 and a subsequent pitting or other processing section 37.

Shaft 32 is usually positioned somewhat rearwardly and below shaft 31 so that the conveyor returns downwardly and rearwardly toward shaft 33, the chains passing about the sprockets on shaft 33 to move upwardly toward the sprockets on shaft 34 through a feed hopper generally indicated at 41 and presently further described.

The conveyor members 17 making up the conveyor 16 preferably include apertured metal plates 56 covered with rubber 57 suitably bonded thereto and apertured as at 58, the aperture size being slightly larger than the cherries or other articles to be handled. The rubber facing is preferably flared as at 59 adjacent the upper side of each aperture to facilitate placing of articles in the aperture. In accordance with this invention, suitable article supporting means such as wires 61 are positioned across each aperture to support an article therein during its transportation from one processing region to another. The wires thus act solely as support means for the cherries or other articles and do not actively cooperate with the article undergoing orientation as will presently appear.

The drive and pitting head

Secured on the side plates is a suitable super-structure 42 carrying an electric motor 43 and a variable speed reducer 44 connected by a chain 46 passed about its drive sprocket 47 to a sprocket 48 on a shaft 49 journaled in the super-structure. The super-structure generally includes suitable pitting or stoning mechanisms such as that disclosed in my Patents 2,157,518 and 2,219,832. Shaft 49 also carries a sprocket 51 thereon connected by a chain 52 to a sprocket indicated at 53 on shaft 31 so that the stoning mechanism and the conveyor 16 are driven in timed relationship, the speed and relation between the two being adjusted by a suitable means such as that disclosed in Figure 1 in my Patent 2,157,518.

The feed hopper

To provide for loading of the conveyor structure 16 I include hopper 41 provided by side plates 40, an end plate 45 and suitable end and side baffles 50 therein after the manner disclosed in my Patent 2,190,970. The conveyor 16 moving upwardly in the direction of the arrow through the hopper 41, each aperture in the conveyor retains a single article which it carries along out of the feed hopper to the presently discussed orientation section 36.

The orientation operation

Because the orientation of articles is required prior to pitting, I will now describe the preferred orientation means. This provides the subject matter claimed in my aforementioned application.

To provide for orientation of the articles I rotate the cherries supported in the apertures 58. This rotation is preferably effected in a continuous manner during passage of the articles through the orientation section 36. Accordingly, to this end, I conveniently mount shafts 62 and 63 between the side plates 12 in suitable journals 66. On shaft 62 I secure a pair of spaced sprockets 67 while a pair of spaced sprockets 68 are secured on shaft 63, these sprockets serving to support opposite spaced chains 69 providing an orientation conveyor 60. Mounted between the chains and rotatably supported therein are a plurality of shafts 71 carrying suitable wheels 72, each wheel being secured to the shaft and extending upwardly into an aperture 58. Each shaft 71 is moved relative to the aperture 58 to rotate an article in the aperture engaged with the wheel. This is accomplished usually during movement of the conveyor 60 by a gear 74 at each end of the shaft engaging a fixed rack 76 secured by bolts 77 and spacers 78 to guide rails 79 carried by brackets 80 secured by studs 81 to the side plates 12 of the machine. Instead of rotating the shafts 71 they can be oscillated by providing spaced racks above and below gear 74 and alternately engaged by the gear; or the rack 76 can be replaced by a chain moved in the same direction or opposite to conveyor 60 and at different rates.

Rotation of the wheels alone is sufficient to result in orientation of the articles such as cherries. Depending upon the weight of the articles and the size the speed of the wheels can be varied. However, with usual size cherries I have successfully used a ¾" wheel having a beveled edge, the wheel being about ⅛" thick and rotating the wheel at about 220 R. P. M., the wheel extending into the aperture for about ¼".

Vibration of the articles

In accordance with this invention I preferably vibrate the articles undergoing orientation at the same time they are subjected to rotation. Conveniently this is achieved by vibrating rails 82 supporting conveyor 16 in the orientation region 36 although it can also be accomplished by vibrating conveyor 60. To this end I pivotally support rails 82 on opposite sides of the machine with a pivotal support 83 at the feed end thereof while at the other end I join the rails together with a suitable shaft 84 and connect this shaft by a link 86 to a suitable vibrating mechanism indicated generally at 87 and mounted upon a bracket 88 on one of the side plates. The rate of vibration can vary over fairly wide limits and I have successfully used frequencies varying between 1,200 and 12,000 cycles per minute. Depending upon the speed of movement of the conveyor 16 and the rate of rotation of the wheels, the speed of vibration can be varied and the three can be varied together to the end that the efficiency of orientation for a selected group of articles is a maximum. To this end, therefore, the vibrating mechanism 87 is preferably made adjustable because it is subject to the greatest variation relative to the other variables.

With the wheels 72 rotating counterclockwise in Figure 5 a cherry is normally jammed against the leading edge of the aperture 58, as appears in Figure 5, and even though the wheel 72 continues to rotate, the cherry will remain in this position.

Fluid flooding

Orientation of the articles is normally facilitated if they are maintained wet during the orientation operation and to this end I preferably position over each row of articles undergoing orientation suitable liquid supply pipes indicated at 91 and provided with a plurality of jets 92 to eject a suitable fluid, such as water, a processing solution or any suitable liquid lubricating mechanism onto the articles, particularly cherries undergoing orientation. This is claimed in my application Serial No. 417,713 filed November 3, 1941.

The pitting mechanism

In the machine disclosed herein it is contemplated that the articles are cherries and that they will be stoned. Accordingly, I provide the pitting mechanism previously mentioned as well as other suitable means to support the cherries during this operation. To this end I accordingly mount shafts 101 and 102 in the side plates by means of suitable bearings indicated at 105. To each of the shafts are keyed suitable sprocket sets 103 and 104 and about the sprockets are trained chains 106 to provide a pitting chuck conveyor 100. A sprocket 107 on shaft 101 is connected by a chain 108 to a sprocket 109 on shaft 31 whereby the conveyor 100 is driven. Shaft 102 also includes a sprocket 111 connected by a chain 112 to a sprocket 114 on a shaft 62 whereby conveyor 60 is driven, both conveyors being driven in time with the main conveyor 16.

Each conveyor chain 106 includes a plurality of spaced angle pieces 117 connected by studs 118 to suitable apertured metal base plates 119 each having bonded thereto the rubber faces indicated at 121, the rubber being bonded to the metal base plate at least along one face thereof and recessed at 122 to receive the article support members 61. The plurality of fruit stone passages 123 are provided to receive and pass the stones ejected from the fruit. To provide proper resilience, each section of the rubber facing is apertured or relieved as at 124 to provide a resilient support for that region of the rubber facing adjacent to the stone passage 123.

In place of bonding the rubber facing directly to the metal, the metal can be relieved and the rubber pitting support or chuck can be provided thereon as an insert. This is shown in Figure 7 wherein the base plate 126 is shown as relieved as at 127. A rubber insert 128 is provided detachably retained by a ring 129 fitting in a complementary groove in the base plate. Any suitable cooperative form of attachment between the base plate and the removable rubber facing can, of course, be employed.

Operation

While it is believed to be clear from the foregoing that the operation of the device is fully set forth, a brief résumé may assist in this understanding. The main conveyor 16 is driven through the motor 43 and the speed reducer 44, the orientation conveyor 60 carrying the rotating wheels and the conveyor 100 carrying the pitting support members each being driven in a timed relationship and at the same rate as the main conveyor properly to position their cooperating elements. With suitable articles to be processed such as cherries placed in the hopper 41, the movement of conveyor 16 through the hopper results in each apertured receptacle in the main conveyor 16 being filled with an article and carried on to the orientation section 36. In this region the main conveyor is rapidly vibrated and, at the same time, each article on the conveyor is lifted from its support means 61 by the rotating wheel, the wheel and the vibrating means cooperating, in the preferred machine, to orient the cherry in that position shown in Figure 5 with the stem indent end of the cherry abutting the wheel. To attain this, the wheel rotates the article about a horizontal axis until the article has been correctly oriented. Once oriented the article remains in this position even though the wheel continues to rotate and the article is vibrated. Finally conveyor 16 moves beyond that point whereat it cooperates with conveyor 60 and the wheels are removed from their supporting engagement with the articles. When this occurs, the articles move down gradually onto the members 61 as the conveyor 60 moves around the sprocket and the wheels are gradually moved out of engagement with the articles. This occurs without the articles becoming removed from their oriented position. As the conveyor 16 moves on toward the cherry stoning station the article support is taken over by the pitting chunks on the pitting chunk conveyor 100.

In this position the articles are moved on toward the pitting station for pitting, the pits being ejected through the passages 123 into the pit receptacle trough 131 while the articles pass on and fall by gravity into the trough 132 as the conveyor passed downwardly about the sprockets on shaft 32.

While I have used the term rubber herein and in some of the claims to describe the flexible support for the fruit, an equivalent rubber substitute can be employed instead.

I claim:

1. A machine for positioning a generally spherical indented fruit having at least one face thereon capable of supporting the fruit stably on a horizontal surface, said machine comprising a first conveyor movable in one direction at a substantially constant rate over a path and including a series of apertures confining a fruit therein against unrestrained horizontal movement and carrying fruit support means to support a fruit in each aperture, and a second conveyor movable for a portion of its travel in said one direction at said rate over substantially the same path as said first conveyor, said second conveyor including resilient support members positionable beneath each corresponding aperture in a fruit supporting relation to said aperture independently of said fruit support means, each resilient member being apertured to pass a fruit stone.

2. A machine for positioning a generally spherical indented fruit having at least one face thereon capable of supporting the fruit stably on a horizontal surface, said machine comprising a first conveyor movable over a path and including a series of apertures confining a fruit therein against unrestrained horizontal movement and carrying fruit support means to support a fruit in each aperture, and a second conveyor movable for a portion of its travel with said first conveyor over said path and including resilient support members positionable beneath each corresponding aperture in a fruit supporting relation to said aperture independently of said fruit support means, each resilient member being apertured to pass a fruit stone.

3. A machine for positioning a generally spherical fruit having at least one face thereon capable of supporting the fruit stably on a horizontal surface, said machine comprising a first conveyor movable over a path and including a series of apertures confining a fruit therein against unrestrained horizontal movement, a second conveyor movable for a portion of its travel over said path and with said first conveyor, said second conveyor including rubber support members positionable beneath each corresponding aperture in a fruit supporting relation to said aperture, each rubber member being apertured to pass a fruit stone.

GEORGE W. ASHLOCK, Jr.